(12) United States Patent
Yoshida

(10) Patent No.: US 11,448,357 B2
(45) Date of Patent: Sep. 20, 2022

(54) STAGE DRIVING DEVICE, METHOD FOR MANUFACTURING STAGE DRIVING DEVICE, AND IMAGING APPARATUS

(71) Applicant: Ricoh Company, Ltd., Tokyo (JP)

(72) Inventor: Norihiro Yoshida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 322 days.

(21) Appl. No.: 16/751,259

(22) Filed: Jan. 24, 2020

(65) Prior Publication Data

US 2020/0278073 A1    Sep. 3, 2020

(30) Foreign Application Priority Data

Feb. 28, 2019   (JP) .............................. JP2019-035650

(51) Int. Cl.
| | |
|---|---|
| *F16M 11/00* | (2006.01) |
| *F16M 11/18* | (2006.01) |
| *F16M 13/02* | (2006.01) |
| *H04N 5/225* | (2006.01) |
| *H04N 5/232* | (2006.01) |
| *H02K 11/215* | (2016.01) |
| *H02K 41/035* | (2006.01) |

(52) U.S. Cl.
CPC .......... *F16M 11/18* (2013.01); *F16M 13/022* (2013.01); *H02K 11/215* (2016.01); *H02K 41/0356* (2013.01); *H04N 5/2253* (2013.01); *H04N 5/2254* (2013.01); *H04N 5/23299* (2018.08); *H02K 2201/18* (2013.01)

(58) Field of Classification Search
CPC .... F16M 11/18; F16M 13/022; H02K 11/215; H02K 41/0356; H04N 5/23299; H04N 5/2254

See application file for complete search history.

(56) References Cited

U.S. PATENT DOCUMENTS

| | | | |
|---|---|---|---|
| 11,174,983 B1 * | 11/2021 | Su ........................... | A47F 5/108 |
| 2009/0316039 A1 | 12/2009 | Yoshida et al. | |
| 2011/0216237 A1 | 9/2011 | Shinohara et al. | |
| 2019/0238736 A1 * | 8/2019 | Morimitsu ......... | F16M 11/2014 |
| 2021/0362877 A1 * | 11/2021 | Wang ..................... | F16M 13/00 |

FOREIGN PATENT DOCUMENTS

JP          2015-055794        3/2015

* cited by examiner

*Primary Examiner* — Amy J. Sterling
(74) *Attorney, Agent, or Firm* — Xsensus LLP

(57) ABSTRACT

A stage driving device includes a secured section; a movable section supported movably along a movement plane relative to the secured section; a driver including a magnet at one of the secured section and the movable section and a coil at the other one of the secured section and the movable section; a magnetic sensor at one of the secured section and the movable section provided with the coil, the magnetic sensor configured to detect a position of the movable section with respect to the secured section; and a magnetic body at the one of the secured section and the movable section provided with the coil, the magnetic body configured to make the position of the movable section stable with respect to the secured section in a direction perpendicular to the movement plane using a magnetic force that acts between the magnetic body and the magnet.

10 Claims, 9 Drawing Sheets

STAGE DRIVING DEVICE, METHOD FOR MANUFACTURING STAGE DRIVING DEVICE, AND IMAGING APPARATUS

CROSS-REFERENCE TO RELATED APPLICATIONS

This patent application is based on and claims priority pursuant to 35 U.S.C. § 119(a) to Japanese Patent Application No. 2019-035650, filed on Feb. 28, 2019, in the Japan Patent Office, the entire disclosure of which is hereby incorporated by reference herein.

BACKGROUND

Technical Field

The present disclosure relates to a stage driving device, a method for manufacturing the stage driving device, and an imaging apparatus.

Description of the Related Art

There is known a stage driving device that moves a movable section (stage), which supports an object to be driven, along a specific movement plane and that uses a voice coil motor as a driver of the movable section. One of a secured section and the movable section includes a magnet and the other one of the secured section and the movable section includes a coil. Applying current to the coil in a magnetic field generates a thrust for driving the movable section. An application example of such a stage driving device is a motion blur correction mechanism for an imaging apparatus. The motion blur correction mechanism moves one of an imaging element and an optical element in a direction orthogonal to the optical axis.

The stage driving device for correcting a motion blur requires to precisely manage the position and movement of one of the imaging element and the optical element, and hence requires a support structure that allows the movable section to stably and smoothly move. For example, a support structure is used, the structure including spherical rolling bodies at a plurality of positions between a secured section and a movable section. The support structure movably supports the movable section via the rolling bodies. Another support structure using one of a guide shaft and a guide rail instead of the spherical rolling bodies is also known.

The support structure including the movable section using the rolling bodies or the like has a predetermined clearance to accommodate individual differences of respective components constituting the stage driving device. However, the position of the movable section may be shifted in a direction different from the direction in which the movable section is expected to move or the movable section may vibrate by the amount of the clearance. When the support structure is applied to the motion blur correction mechanism of the imaging apparatus, the positional shift or vibration of the movable section may cause one of the imaging element and the optical element to be inclined, possibly resulting in a positional shift of an image surface, a deterioration in optical performance, and generation of an unusual sound during the movement for correcting a motion blur. When the imaging apparatus takes a movie, the unusual sound generated in the imaging apparatus is also recorded as sound. Reducing the unusual sound from the stage driving device for correcting a motion blur is demanded of, in particular, the imaging apparatus capable of taking a movie.

SUMMARY

In one aspect of this disclosure, there is provided an improved stage driving device includes a secured section; a movable section supported movably along a movement plane relative to the secured section; a driver including at least one magnet at one of the secured section and the movable section and at least one coil at the other one of the secured section and the movable section, the driver being configured to move the movable section along the movement plane; at least one magnetic sensor at one of the secured section and the movable section provided with the coil, the magnetic sensor being configured to detect a position of the movable section with respect to the secured section; and at least one magnetic body at the one of the secured section and the movable section provided with the coil, the magnetic body being configured to make the position of the movable section stable with respect to the secured section in a direction perpendicular to the movement plane using a magnetic force that acts between the magnetic body and the magnet. The magnetic body and the magnetic sensor are located at mutually different positions in a direction along the movement plane. In another aspect of this disclosure, there is provided an improved method for manufacturing a stage driving device including a secured section, a movable section supported movably along a movement plane relative to the secured section, and a driver including at least one magnet at one of the secured section and the movable section and at least one coil at the other one of the secured section and the movable section, the driver being configured to move the movable section along the movement plane. The method further includes attaching at least one magnetic sensor and at least one magnetic body to one of the secured section and the movable section provided with the coil, at mutually different positions in a direction along the movement plane, the magnetic sensor being configured to detect a position of the movable section with respect to the secured section, the magnetic body being configured to make the position of the movable section stable with respect to the secured section in a direction perpendicular to the movement plane using a magnetic force that acts between the magnetic body and the magnet.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
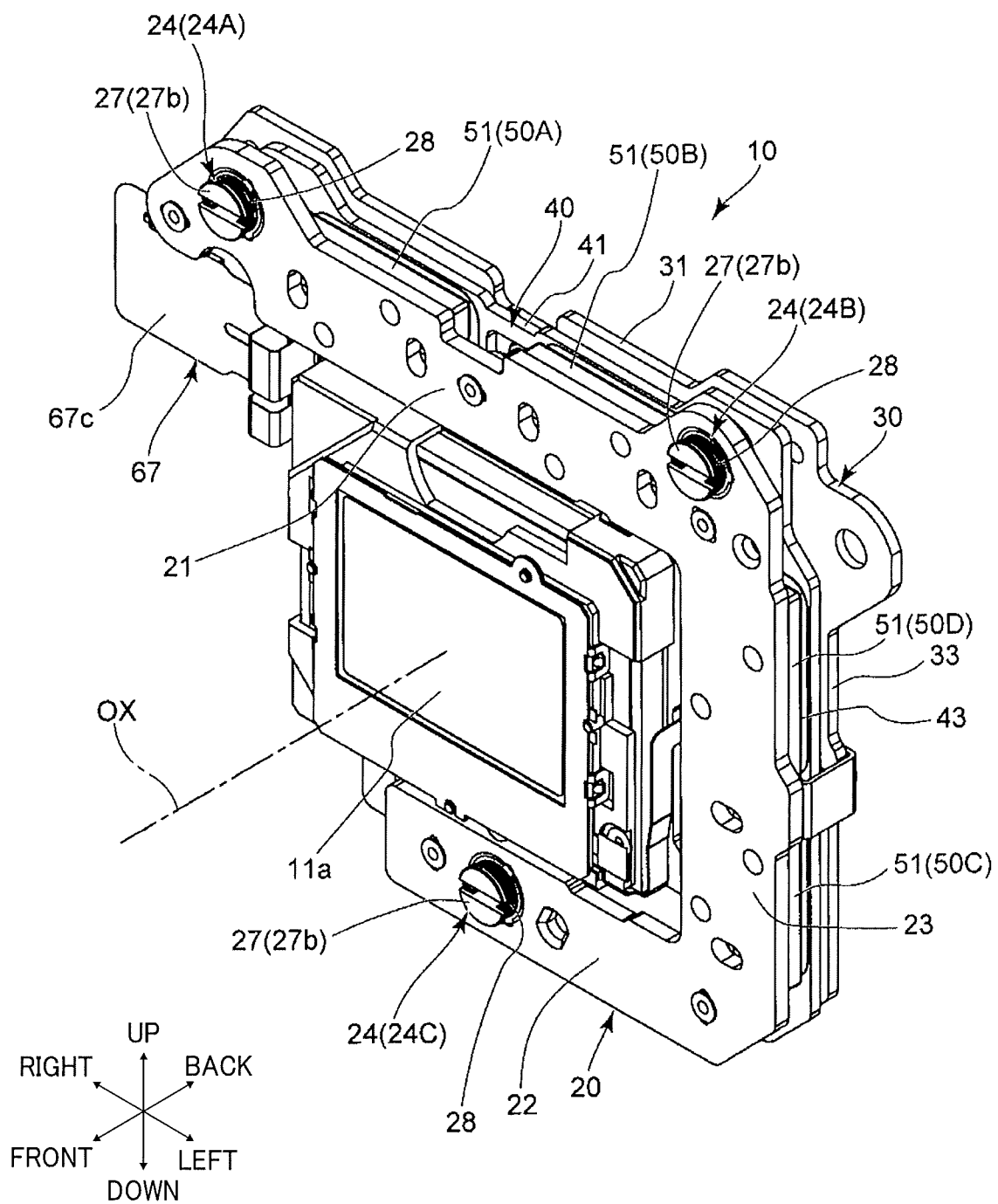
FIG. 1 is a front perspective view of a stage driving device.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Figure 2:
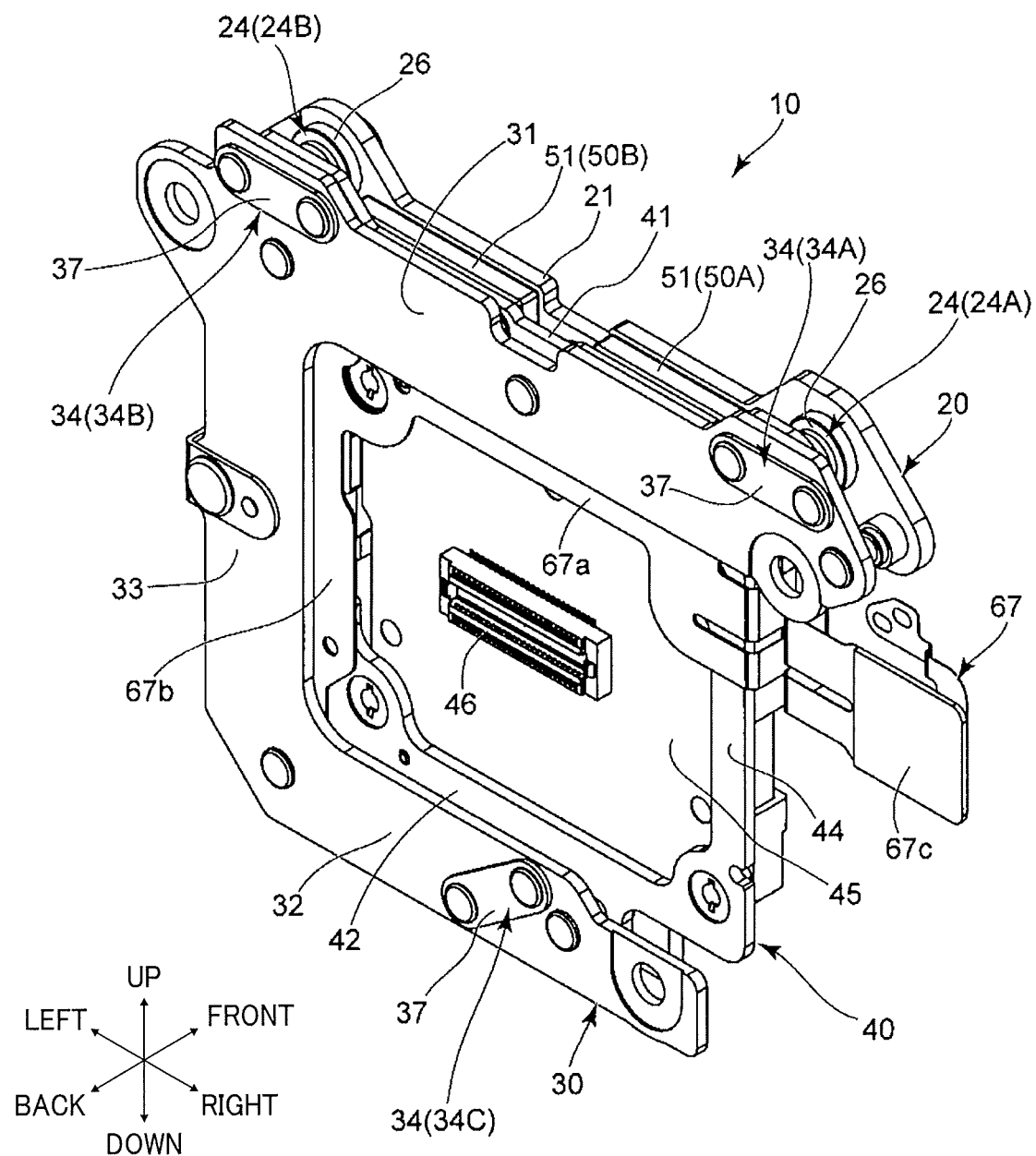
FIG. 2 is a rear perspective view of the stage driving device.

An embodiment to which the present disclosure is applied is described below referring to the drawings. A stage driving device 10 according to the embodiment illustrated in FIGS. 1 and 2 is installed in an imaging apparatus (not illustrated). The stage driving device 10 moves an imaging element 11 (indicated by a broken line in FIG. 3) along a plane (a movement plane) perpendicular to an optical axis OX (FIG. 1) of an optical system to correct a motion blur. The front side of the imaging element 11 is covered with a cover glass 11a.

In the following description, the direction along the optical axis OX is defined as an optical-axis direction. The forward and backward, upward and downward, and right and left directions of the imaging apparatus when the stage driving device 10 is installed in the imaging apparatus are indicated by arrows in the drawings. In the embodiment, the optical-axis direction agrees with the forward and backward directions of the imaging apparatus. The object side is the forward of the imaging apparatus and the image side is the backward of the imaging apparatus in the optical-axis direction. In the embodiment, an optical system including optical elements linearly disposed along the optical axis OX is expected. However, any optical system may be employed as far as the optical system forms an object image on a light receiving surface of the imaging element 11. For example, a bending optical system including a reflecting optical element such as a prism may be used. When the bending optical system is used, the correspondence of the forward and backward, upward and downward, and right and left directions of the imaging apparatus may differ from the correspondence of the illustrated directions of the stage driving device 10.

The stage driving device 10 includes a secured section that is secured to the inside of the imaging apparatus, and a movable section that is supported movably relative to the secured section. The secured section includes a front yoke 20 and a rear yoke 30. The movable section includes an intermediate plate 40. The front yoke 20, the rear yoke 30, and the intermediate plate 40 are plate-shaped bodies extending in a direction perpendicular to the optical axis OX (in a direction along the movement plane). In the optical-axis direction, the front yoke 20 is disposed forward, the rear yoke 30 is disposed backward, and the intermediate plate 40 is disposed between the front yoke 20 and the rear yoke 30.

Figure 5:
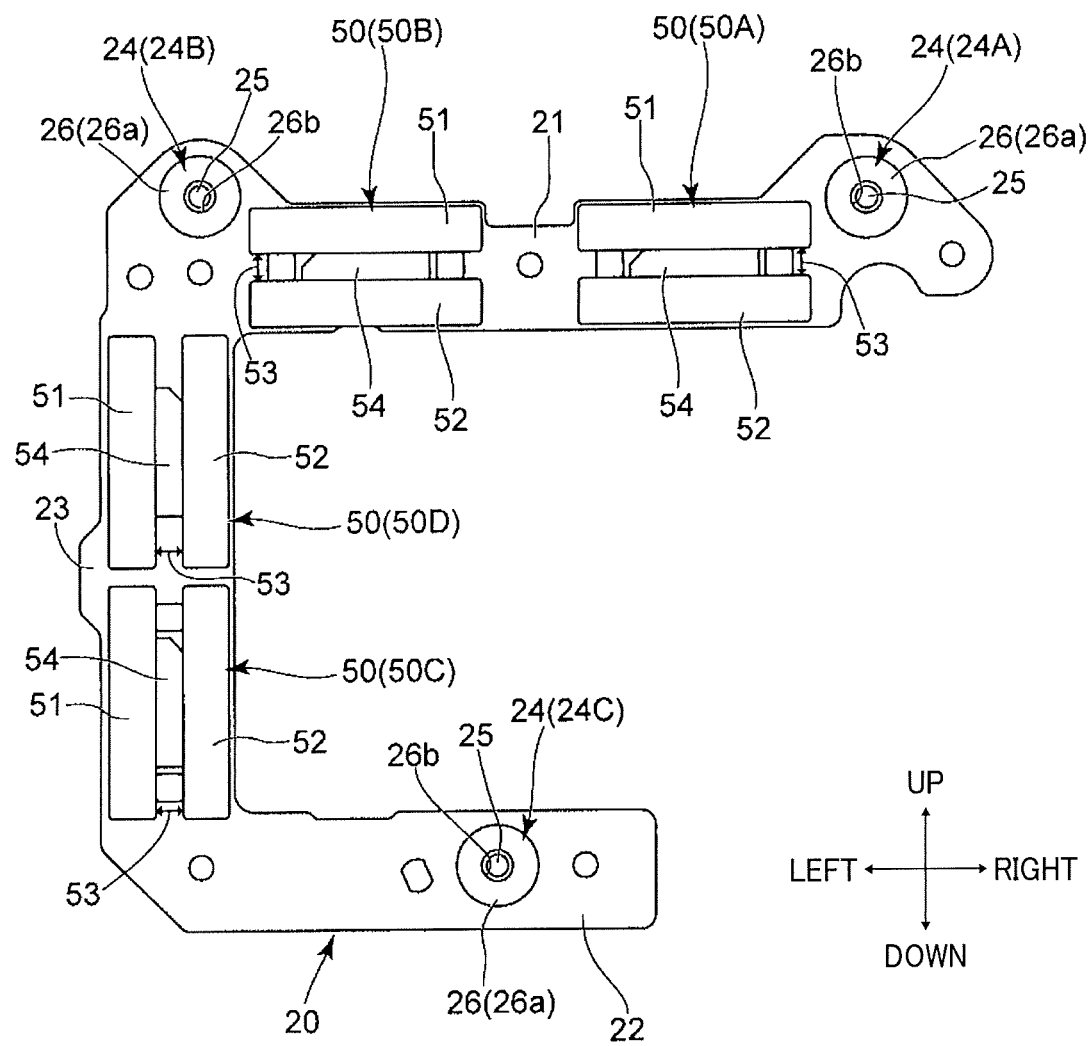
FIG. 5 is a rear view of a front yoke.

The front yoke 20 and the rear yoke 30 are made of magnetic bodies of, for example, soft iron. As illustrated in FIG. 5, the front yoke 20 has an upper plate portion 21 and a lower plate portion 22 extending in the right and left directions, and a left plate portion 23 extending in the upward and downward directions. The front yoke 20 has an angular C-like outline shape in which the left plate portion 23 couples left end portions of the upper plate portion 21 and the lower plate portion 22 to each other. The rear yoke 30 has a configuration substantially corresponding to the front yoke 20. The rear yoke 30 has an angular C-like outline shape in which a left plate portion 33 couples left end portions of an upper plate portion 31 and a lower plate portion 32 extending in the right and left directions. The upper plate portion 21 of the front yoke 20 is longer than the lower plate portion 22 in the right and left directions. The upper plate portion 31 of the rear yoke 30 is longer than the lower plate portion 32 in the right and left directions.

The front yoke 20 includes three support guide portions 24. The three support guide portions 24 include a support guide portion 24A disposed near the distal end (the right end) of the upper plate portion 21, a support guide portion 24B disposed near the boundary between the upper plate portion 21 and the left plate portion 23, and a support guide portion 24C disposed in the middle of the lower plate portion 22. The sectional structure of the support guide portion 24 illustrated in FIG. 6 is common to the support guide portions 24A, 24B, and 24C at three positions.

Figure 6:
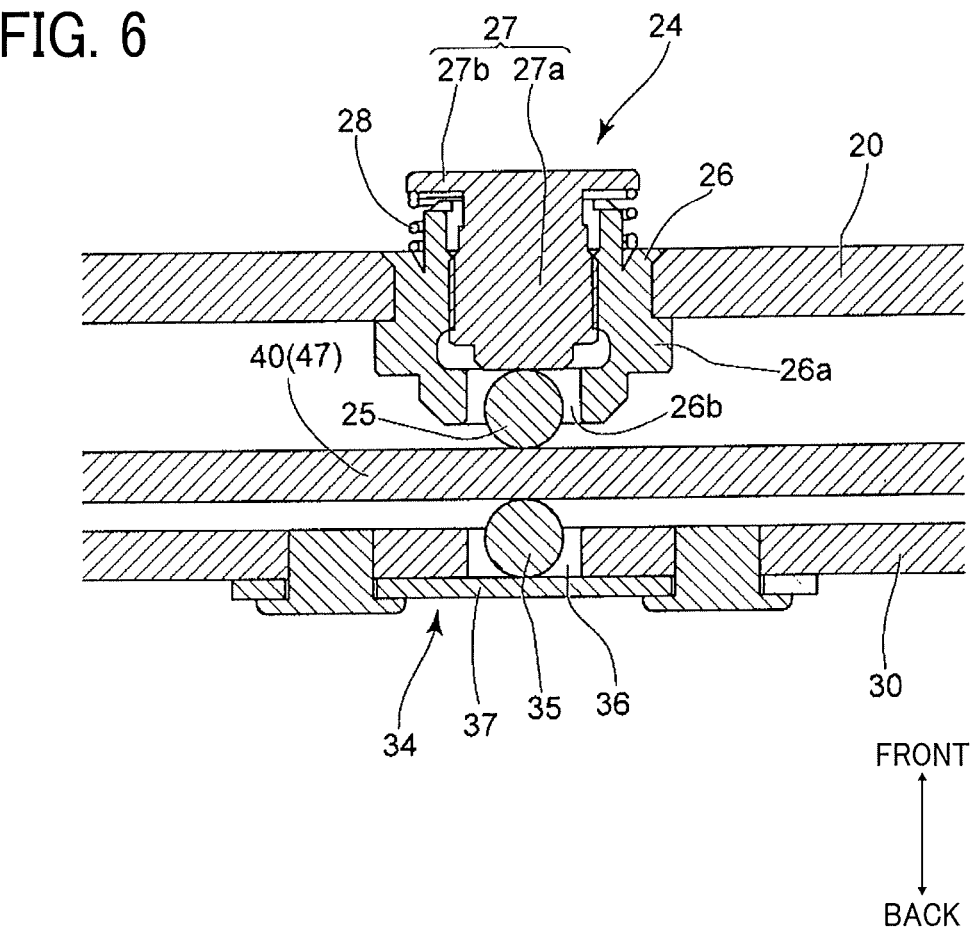
FIG. 6 is a cross-sectional view illustrating a support structure of the intermediate plate, the support structure including the front yoke and a rear yoke.

As illustrated in FIG. 6, each support guide portion 24 includes a spherical rolling body 25, a retainer 26, an adjustment screw 27, and an adjustment spring 28. The retainer 26 is inserted into a through hole that is formed in the front yoke 20 and that extends in the forward and backward directions. The retainer 26 has a flange 26a that is in contact with the rear surface of the front yoke 20 and that restricts the forward movement of the retainer 26 relative to the front yoke 20. The retainer 26 has a housing hole 26b at an end portion facing the backward. The housing hole 26b houses the rolling body 25. The adjustment screw 27 has a shaft portion 27a and a head portion 27b. The shaft portion 27a has an external thread and screwed into a screw hole in the retainer 26. The head portion 27b is located on the front surface side of the front yoke 20. The head portion 27b has a larger diameter than the shaft portion 27a. The adjustment spring 28 is inserted between the head portion 27b and the retainer 26. The distal end of the shaft portion 27a comes into contact with the rolling body 25. The position in the forward and backward directions (the protruding amount from the housing hole 26b) of the rolling body 25 changes in accordance with the fastening amount of the adjustment screw 27. The adjustment spring 28 reduces rattling between the retainer 26 and the adjustment screw 27.

The rear yoke 30 includes three support guide portions 34. The three support guide portions 34 include a support guide portion 34A disposed near the distal end (the right end) of the upper plate portion 31, a support guide portion 34B disposed near the boundary between the upper plate portion 31 and the left plate portion 33, and a support guide portion 34C disposed in the middle of the lower plate portion 32. The sectional structure of the support guide portion 34 illustrated in FIG. 6 is common to the support guide portions 34A, 34B, and 34C.

As illustrated in FIG. 6, each support guide portion 34 includes a spherical rolling body 35, a housing hole 36 housing the rolling body 35, and a pressure plate 37. The housing hole 36 is a through hole extending through the rear yoke 30 in the forward and backward directions. The pressure plate 37 is secured to the rear surface of the rear yoke 30 by rivets to close a rear portion of the housing hole 36. The pressure plate 37 restricts the backward movement of the rolling body 35. The rolling body 35 protrudes forward with respect to the front surface of the rear yoke 30.

Figure 3:
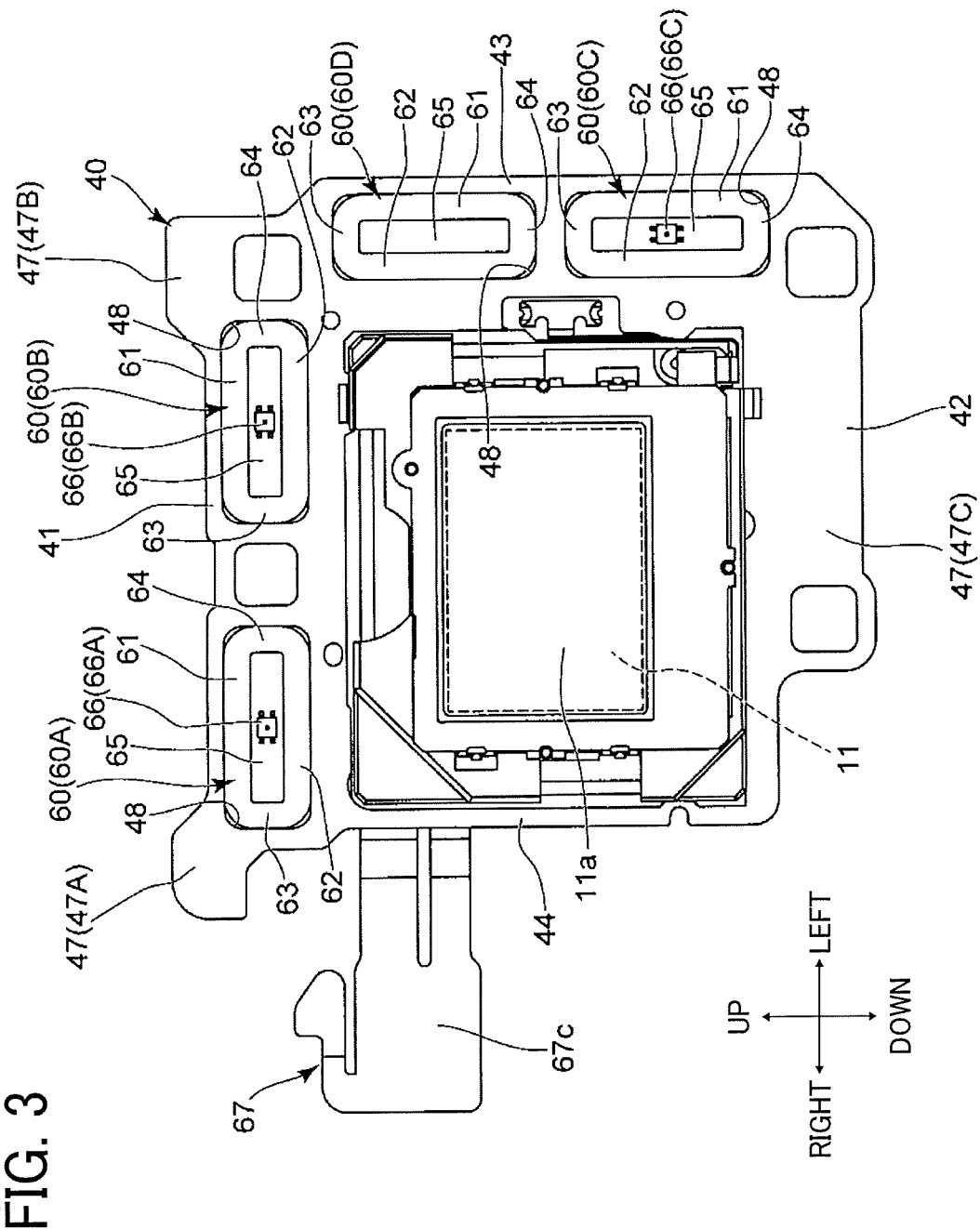
FIG. 3 is a front view of an intermediate plate constituting the stage driving device.
Figure 4:
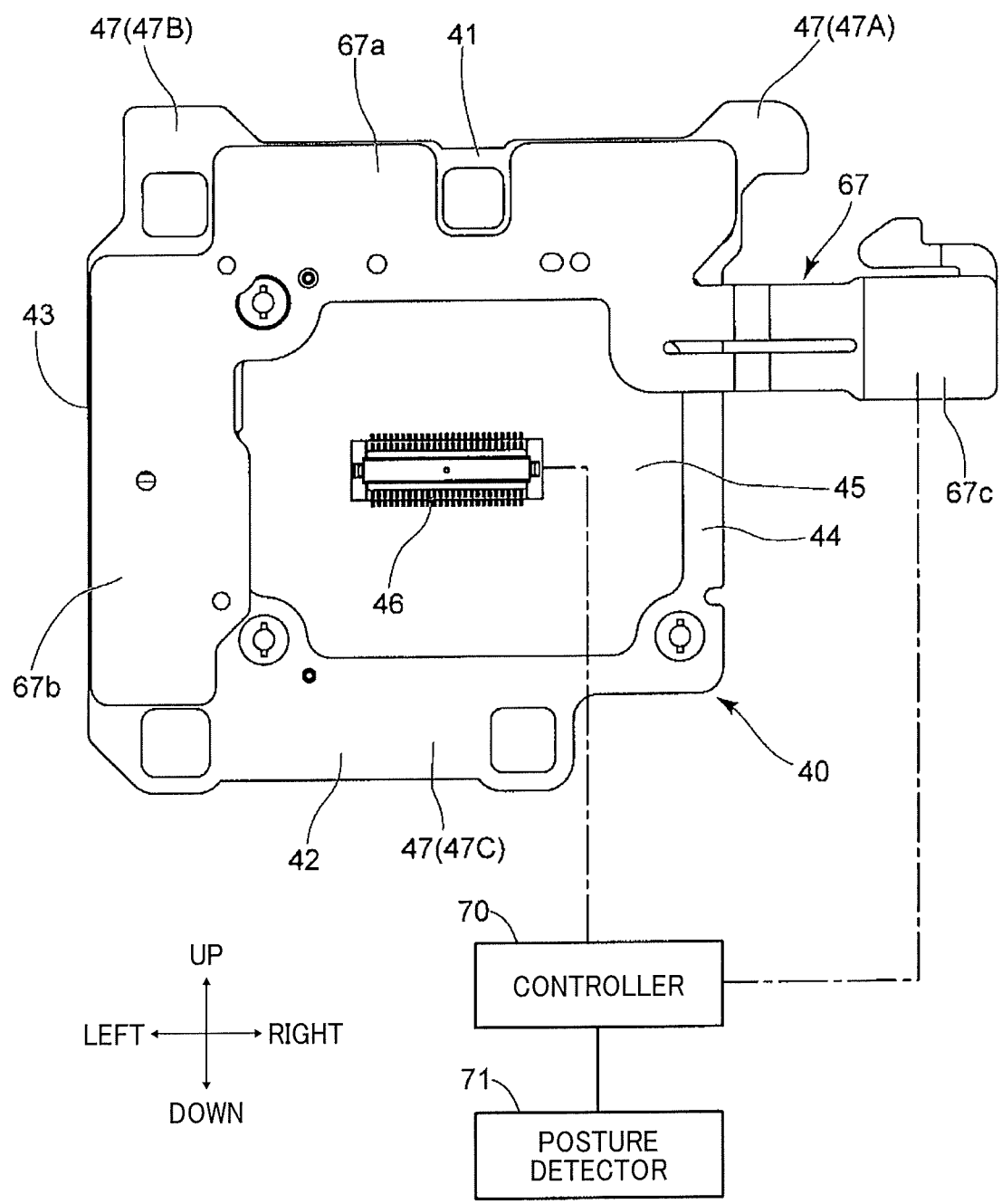
FIG. 4 is a rear view of the intermediate plate.

As illustrated in FIGS. 3 and 4, the intermediate plate 40 has an upper plate portion 41 and a lower plate portion 42 extending in the right and left directions, a left plate portion 43 that couples left end portions of the upper plate portion 41 and the lower plate portion 42, and a right plate portion 44 that couples right end portions of the upper plate portion 41 and the lower plate portion 42. An imaging element substrate 45 is attached to a region surrounded by the upper plate portion 41, the lower plate portion 42, the left plate portion 43, and the right plate portion 44 (see FIGS. 2 and 4). The imaging element 11 is attached to the front surface of the imaging element substrate 45. A connector 46 is provided on the rear surface of the imaging element substrate 45. The light receiving surface of the imaging element 11 has long sides extending in the right and left directions, and short sides extending in the upward and downward directions.

When the front yoke 20 and the rear yoke 30 are assembled from the front and rear of the intermediate plate 40, the support guide portion 24A and the support guide portion 34A are disposed next to each other in the forward and backward directions, the support guide portion 24B and the support guide portion 34B are disposed next to each other in the forward and backward directions, and the support guide portion 24C and the support guide portion 34C are disposed in the forward and backward directions. The intermediate plate 40 has three sandwiched portions 47 at three positions sandwiched between the support guide portions 24 and the support guide portions 34. A portion sandwiched between the support guide portion 24A and the support guide portion 34A is referred to as a sandwiched portion 47A, a portion sandwiched between the support guide portion 24B and the support guide portion 34B is referred to as a sandwiched portion 47B, and a portion sandwiched between the support guide portion 24C and the support guide portion 34C is referred to as a sandwiched portion 47C.

The front and rear surfaces of each sandwiched portion 47 are planes perpendicular to the optical axis OX. The rolling body 25 of the support guide portion 24 comes into contact with the front surface of each sandwiched portion 47. The rolling body 35 of the support guide portion 34 comes into contact with the rear surface of each sandwiched portion 47. The contact pressure of the rolling body 25 against the sandwiched portion 47 can be adjusted in accordance with the fastening amount of the adjustment screw 27 of each support guide portion 24.

When the intermediate plate 40 is assembled between the front yoke 20 and the rear yoke 30, the upper plate portion 41 is located between the upper plate portion 21 and the upper plate portion 31, the lower plate portion 42 is located between the lower plate portion 22 and the lower plate portion 32, and the left plate portion 43 is located between the left plate portion 23 and the left plate portion 33.

The intermediate plate 40 sandwiched from the front and rear by the three support guide portions 24 (the rolling bodies 25) and the three support guide portions 34 (the rolling bodies 35) is movable along the movement plane perpendicular to the optical axis OX. The support by the rolling bodies 25 and the rolling bodies 35 does not restrict the movement direction of the intermediate plate 40 within the movement plane. Thus, the intermediate plate 40 can be linearly moved in the upward and downward directions and the right and left directions, can be moved in an oblique direction containing both components in the upward and downward directions and the right and left directions, and can be tilted around an imaginary axis parallel to the optical axis OX. The front yoke 20 and the rear yoke 30 have mechanical stoppers that define the maximum movement ends of the intermediate plate 40 along the movement plane.

Since the sandwiched portions 47 having smooth planes are in contact with the spherical rolling bodies 25 and rolling bodies 35, the intermediate plate 40 can be smoothly moved with low resistance. Moreover, since the intermediate plate 40 is supported at the three positions in total including the two support positions (the subset of the support guide portion 24A and the support guide portion 34A, and the subset of the support guide portion 24B and the support guide portion 34B) separated in the right and left directions, and the one support position (the subset of the support guide portion 24C and the support guide portion 34C) that is different from the former two positions in the upward and downward directions. The support at the three positions can prevent the intermediate plate 40 from being inclined with respect to the movement plane.

The stage driving device 10 includes a voice coil motor as a driver to move the intermediate plate 40 along the movement plane. The voice coil motor energizes a coil disposed in a magnetic circuit to generate a thrust. The voice coil motor includes a permanent magnet 50 and a coil 60 between the front yoke 20 and the rear yoke 30.

As illustrated in FIG. 5, a plurality of permanent magnets 50 are attached to the rear surface of the front yoke 20. More specifically, two permanent magnets 50 are disposed on the upper plate portion 21, and two permanent magnets 50 are disposed on the left plate portion 23. Thus the four permanent magnets 50 in total are disposed. The two permanent magnets 50 disposed on the upper plate portion 21 are referred to as a permanent magnet 50A and a permanent magnet 50B sequentially from the right. The two permanent magnets 50 disposed on the left plate portion 23 are referred to as a permanent magnet 50C and a permanent magnet 50D sequentially from the lower side.

Each permanent magnet 50 includes a pair of divided magnets 51 and 52. The divided magnets 51 and 52 are secured to the front yoke 20 by bonding or another method. The divided magnet 51 and the divided magnet 52 have narrow and long rectangular shapes and have the longitudinal directions parallel to each other. The divided magnet 51 and the divided magnet 52 have a gap 53 therebetween. The front yoke 20 includes a spacer 54 for forming the gap 53. The divided magnet 51 is disposed along one side portion of the spacer 54. The divided magnet 52 is disposed along the other side portion of the spacer 54.

In each of the permanent magnet 50A and the permanent magnet 50B disposed on the upper plate portion 21, the divided magnet 51 and the divided magnet 52 have the longitudinal directions extending in the right and left directions, and have the gap 53 in the upward and downward directions between the divided magnet 51 and the divided magnet 52. In each of the permanent magnet 50C and the permanent magnet 50D disposed on the left plate portion 23, the divided magnet 51 and the divided magnet 52 have the longitudinal directions extending in the upward and downward directions, and have the gap 53 in the right and left directions between the divided magnet 51 and the divided magnet 52.

As illustrated in FIG. 3, a plurality of coils 60 are attached to the intermediate plate 40. More specifically, two coils 60 are disposed at the upper plate portion 41, and two coils 60 are disposed at the left plate portion 43. Thus the four coils 60 in total are disposed. The two coils 60 disposed at the upper plate portion 41 are referred to as a coil 60A and a coil 60B sequentially from the right. The two coils 60 disposed at the left plate portion 43 are referred to as a coil 60C and a coil 60D sequentially from the lower side. Each coil 60 is inserted into a through hole 48 formed in each of the upper plate portion 41 and the left plate portion 43 and extending in the forward and backward directions. The front surface of each coil 60 is exposed from the front surface of the intermediate plate 40.

Each coil 60 is an air-core coil in which a lead wire is wound around an air-core portion 65. Each coil 60 has a pair of parallel long-side portions (straight portions) 61 and 62 sandwiching the air-core portion 65 and having the lead wire extending straight. Each coil 60 also has a pair of coupling portions 63 and 64 coupling both ends of the long-side portions 61 and 62. Increasing the length of the long-side portions 61 and 62 can increase the thrust that is generated when the coil 60 is energized.

In each of the coil 60A and the coil 60B disposed at the upper plate portion 41, the long-side portion 61 and the long-side portion 62 have the longitudinal directions extending in the right and left directions. The long-side portion 61 and the long-side portion 62 are spaced apart from each other in the upward and downward directions via the air-core portion 65. In each of the coil 60C and the coil 60D disposed at the left plate portion 43, the long-side portion 61 and the long-side portion 62 have the longitudinal directions extending in the upward and downward directions. The long-side portion 61 and the long-side portion 62 are spaced apart from each other in the right and left directions via the air-core portion 65.

Figure 7:
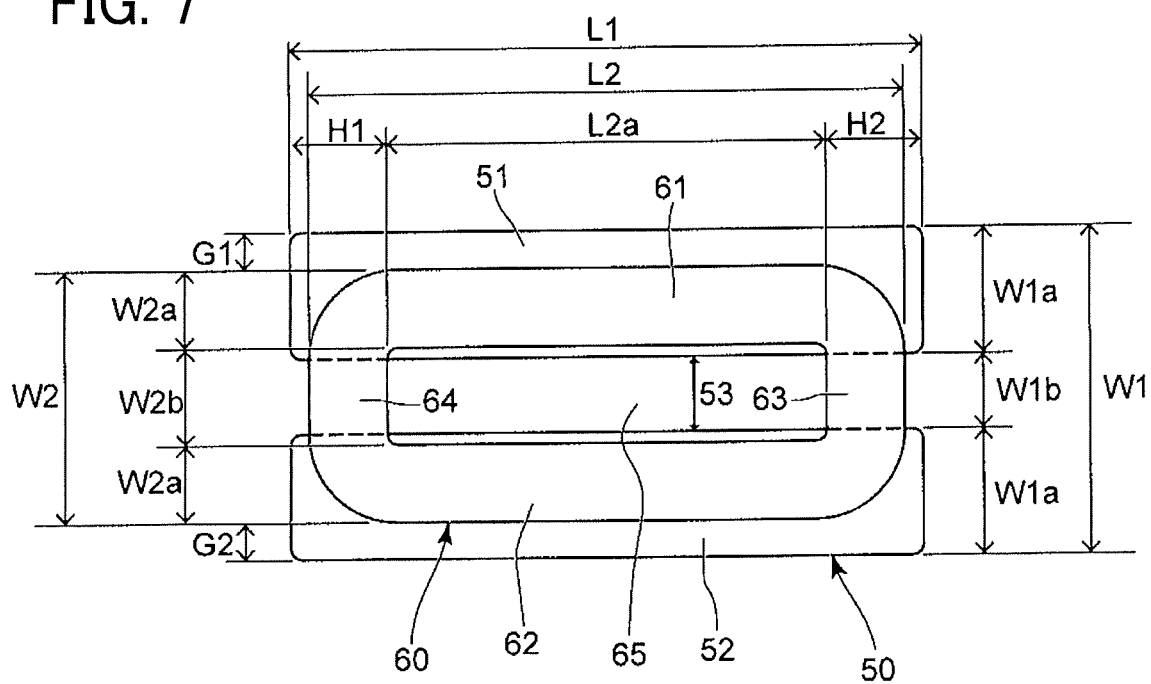
FIG. 7 is a rear view illustrating an arrangement of a permanent magnet and a coil.
Figure 8:
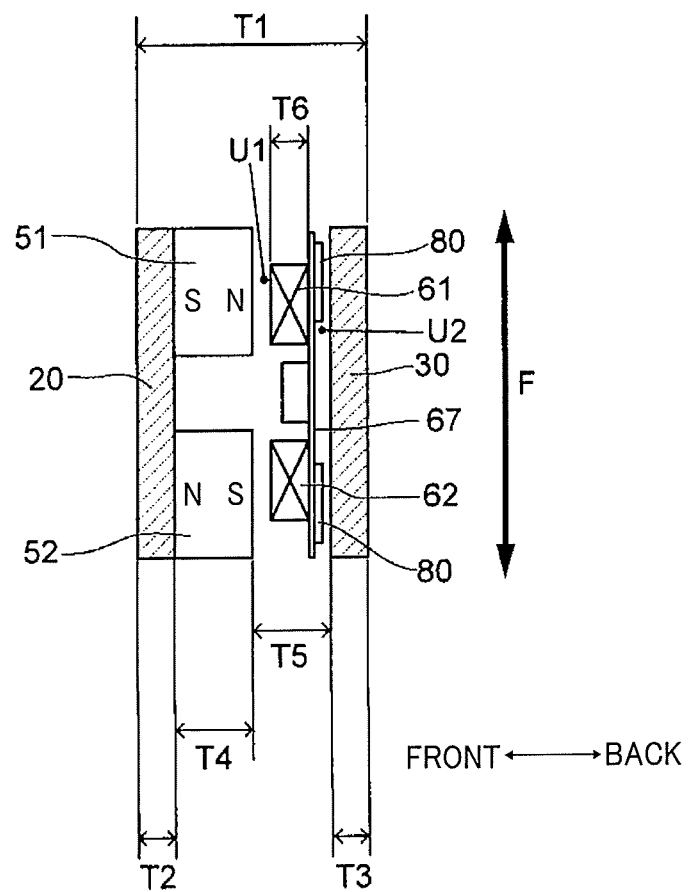
FIG. 8 is a cross-sectional view of the stage driving device in a view sectioned along the transverse direction of the coil.

FIG. 7 illustrates the relationship between (projection positions of) each permanent magnet 50 and the corresponding coil 60 in a view in the optical-axis direction. FIG. 8 illustrates the sectional structure in an area around each permanent magnet 50 and the corresponding coil 60 in a state in which the intermediate plate 40 is supported between the front yoke 20 and the rear yoke 30. The structure illustrated in FIGS. 7 and 8 is common to the permanent magnets 50 and the coils 60 at the four positions.

FIGS. 7 and 8 illustrate the positional relationship between the permanent magnet 50 and the coil 60 when the intermediate plate 40 is located at an initial position. The initial position is a design reference position at which the coil 60 is located without being deviated from the permanent magnet 50 in any of the upward and downward directions and the right and left directions. In relation to the imaging apparatus, the state in which the optical axis OX of the optical system passes through a predetermined position (for example, the center of the external shape of the light receiving surface) of the imaging element 11 is set as the initial position of the intermediate plate 40.

For the permanent magnet 50, in a view in the optical-axis direction like a view in FIG. 7, the size in the longitudinal direction of each of the divided magnets 51 and 52 is referred to as "length", and the size in the transverse direction of each of the divided magnets 51 and 52 is referred to as "width". For the coil 60, in a view in the optical-axis direction like a view in FIG. 7, the size in the longitudinal direction of each of the long-side portions 61 and 62 is referred to as "length", and the size in the transverse direction of each of the long-side portions 61 and 62 is referred to as "width". The size in the forward and backward directions of each component of the stage driving device 10 illustrated in FIG. 8 is referred to as "thickness".

Referring to FIG. 7, the sizes of and the positional relationship between the permanent magnet 50 and the coil 60 are described. The divided magnet 51 and the divided magnet 52 constituting the permanent magnet 50 have the same length and are disposed at positions aligned in the longitudinal direction. Thus, a length L1 of each of the divided magnets 51 and 52 is equivalent to a length (an external length) L1 of the entire permanent magnet 50. The divided magnet 51 and the divided magnet 52 have widths W1$a$ equivalent to each other. The sum of the width W1$a$ of the divided magnet 51, the width W1$a$ of the divided magnet 52, and a width W1$b$ of the gap 53 is equivalent to a width (an external width) W1 of the entire permanent magnet 50.

The long-side portions 61 and 62 of the coil 60 have lengths equivalent to a length L2$a$ of the air-core portion 65. The sum of the length L2$a$ of the air-core portion 65, the height of wounded lead wire at the coupling portion 63, and the height of wounded lead wire at the coupling portion 64 is equivalent to a length (an external length) L2 of the entire coil 60. The long-side portion 61 and the short side portion 62 have widths (the heights of wounded lead wire) W2$a$ equivalent to each other. The sum of a width W2$a$ of the long-side portion 61, a width W2$a$ of the long-side portion 62, and a width W2$b$ of the air-core portion 65 is equivalent to a width (an external width) W2 of the entire coil 60.

The width W1 of the entire permanent magnet 50 is larger than the width W2 of the entire coil 60. The width W1$a$ of each of the divided magnets 51 and 52 is larger than the width W2$a$ of each of the long-side portions 61 and 62 of the coil 60. The width W1$b$ of the gap 53 of the permanent magnet 50 is smaller than the width W2$b$ of the air-core portion 65 of the coil 60.

At the initial position illustrated in FIG. 7, the width W2$a$ of each of the long-side portions 61 and 62 of the coil 60 is within the range of the width W1$a$ of corresponding one of the divided magnets 51 and 52 (the entire width W2$a$ overlaps the width W1$a$ in a view in the optical-axis direction). The divided magnets 51 and 52 respectively have driving margins G1 and G2 in the width direction, the driving margins G1 and G2 not overlapping the long-side portions 61 and 62 at the initial position. When the coil 60 is moved from the initial position to one side in the width direction (upward in FIG. 7) within the range of the driving margin G1, a state in which the entire width W2$a$ of the long-side portion 61 is within the range of the width W1$a$ of the divided magnet 51 is maintained. When the coil 60 is moved from the initial position to the other side in the width direction (downward in FIG. 7) within the range of the driving margin G2, a state in which the entire width W2$a$ of the long-side portion 62 is within the range of the width W1$a$ of the divided magnet 52 is maintained. Thus, when the permanent magnet 50 and the coil 60 are moved relative to each other in the width direction, a relation where the long-side portions 61 and 62 respectively directly face the divided magnets 51 and 52 in the forward and backward directions (the projection positions of the long-side portions 61 and 62 respectively overlap the divided magnets 51 and 52) is ensured within the ranges of the driving margins G1 and G2. The intermediate plate 40 can be moved within the ranges without a deviation of the coil 60 from the permanent magnet 50. The range in which the width W2 of the coil 60 is accommodated in the width W1 of the permanent magnet 50 is an actual driving range in which the voice coil motor controls the driving of the intermediate plate 40. The actual driving range is smaller than the mechanically movable range of the intermediate plate 40 that is limited by the stoppers.

The length (the external length) L2 of the entire coil 60 is larger than the length L2a of the air-core portion 65. The length L2a of the air-core portion 65 is equivalent to each of the substantial lengths of the long-side portions 61 and 62. The length L1 of each of the divided magnets 51 and 52 of the permanent magnet 50 is larger than the length L2 of the entire coil 60.

At the initial position illustrated in FIG. 7, the length L2a of the air-core portion 65 is within the range of the length L1 of each of the divided magnets 51 and 52. The divided magnets 51 and 52 respectively have driving margins H1 and H2 in the longitudinal direction, the driving margins H1 and H2 not overlapping the long-side portions 61 and 62 at the initial position. When the coil 60 is moved from the initial position to one side and the other side in the longitudinal direction within the ranges of the driving margins H1 and H2, a state in which the entire lengths of the long-side portions 61 and 62 are respectively within the ranges of the entire lengths of the divided magnets 51 and 52 is maintained. Thus, when the permanent magnet 50 and the coil 60 are moved relative to each other in the longitudinal direction, a relation where the long-side portions 61 and 62 respectively directly face the divided magnets 51 and 52 in the forward and backward directions (the projection positions of the long-side portions 61 and 62 respectively overlap the divided magnets 51 and 52) is ensured within the ranges of the driving margins H1 and H2. The intermediate plate 40 can be moved within the ranges without a deviation of the coil 60 from the permanent magnet 50. The range in which the length L2a of the air-core portion 65 (the long-side portions 61 and 62) is accommodated in the length L1 of the permanent magnet 50 is an actual driving range in which the voice coil motor controls the driving of the intermediate plate 40. The actual driving range is smaller than the mechanically movable range of the intermediate plate 40 that is limited by the stoppers.

The thickness in the forward and backward directions of each component of the stage driving device 10 is described referring to FIG. 8. The dimension from the front surface of the front yoke 20 to the rear surface of the rear yoke 30 is a thickness T1 of the entire stage driving device 10. When a thickness T2 of the front yoke 20, a thickness T3 of the rear yoke 30, and a thickness T4 of the permanent magnet 50 are subtracted from the thickness T1, a gap thickness T5 is obtained. The gap thickness T5 is the dimension in the forward and backward directions from the rear surface of the permanent magnet 50 to the front surface of the rear yoke 30. The coil 60 (including the intermediate plate 40 holding the coil 60 in the through hole 48) is accommodated in the gap thickness T5. A thickness (the thickness of the wound lead wire) T6 of the coil 60 in the forward and backward directions is smaller than the gap thickness T5. A space U1 is defined between the rear surface of the permanent magnet 50 and the front surface of the coil 60. A space U2 is defined between the rear surface of the coil 60 and the front surface of the rear yoke 30. A flexible substrate 67 and a magnetic body 80 (both described later) are disposed in the space U2.

The divided magnet 51 and the divided magnet 52 of the permanent magnet 50 are magnetized as illustrated in FIG. 8. A magnetic field is formed in the forward and backward directions between the front yoke 20 and the rear yoke 30. The coil 60 is located within the magnetic field. The divided magnet 51 faces the long-side portion 61 in the forward and backward directions. The divided magnet 52 faces the long-side portion 62 in the forward and backward directions. When the coil 60 is energized, based on the Fleming's left-hand rule, a thrust F is generated in a direction perpendicular to the direction of the magnetic field (the forward and backward directions) and the direction of the current along the long-side portions 61 and 62 (the direction orthogonal to the paper surface of FIG. 8). With the coil 60A and the coil 60B, since the current flows in the right and left directions along the long-side portion 61 and the long-side portion 62, a thrust F is generated in the upward and downward directions. With the coil 60C and the coil 60D, since the current flows in the upward and downward directions along the long-side portion 61 and the long-side portion 62, a thrust F is generated in the right and left directions Energization of the four coils 60 is properly controlled to move the intermediate plate 40 to a desirable position within the movement plane perpendicular to the optical axis OX. Since the permanent magnets 50 and the coils 60 are disposed at two positions along a long-side portion of the light receiving surface of the imaging element 11 (the subset of the permanent magnet 50A and the coil 60A, and the subset of the permanent magnet 50B and the coil 60B), and at two positions along a short side portion of the light receiving surface of the imaging element 11 (the subset of the permanent magnet 50C and the coil 60C, and the subset of the permanent magnet 50D and the coil 60D). High driving force can be applied to the intermediate plate 40 in a well-balanced manner.

A magnetic sensor 66 is provided inside the air-core portion 65 of each coil 60. The magnetic sensor 66 moves together with the intermediate plate 40 similarly to the coil 60. The magnetic sensor 66 includes a hall element. The magnetic sensor 66 detects a change in the state of the magnetic field due to a change in the position of the intermediate plate 40 relative to the permanent magnet 50 by the movement of the intermediate plate 40. The magnetic sensor 66 is disposed, according to the embodiment, inside each of the three air-core portions 65 of the three coils 60A, 60B, and 60C. The magnetic sensor 66 is not disposed in the air-core portion 65 of the residual one coil 60D. The magnetic sensors 66 disposed in the respective air-core portions 65 of the coils 60A, 60B, and 60C are identified as magnetic sensors 66A, 66B, and 66C. The upper magnetic sensors 66A and 66B detect the position of the intermediate plate 40 mainly in the upward and downward directions. The left magnetic sensor 66C detects the position of the intermediate plate 40 mainly in the right and left directions. Thus, changes in the position and posture of the intermediate plate 40 within the movement plane perpendicular to the optical axis OX can be detected based on the detection signals of the magnetic sensors 66A, 66B, and 66C.

The four coils 60 and the three magnetic sensors 66 are provided on the flexible substrate 67. The flexible substrate 67 is attached to the rear surface of the intermediate plate 40. The flexible substrate 67 has an upper piece portion 67a extending along the rear surface of the upper plate portion 41 of the intermediate plate 40, and a left piece portion 67b extending along the rear surface of the left plate portion 43 of the intermediate plate 40. The coils 60A and 60B and the magnetic sensors 66A and 66B are arranged on the front surface of the upper piece portion 67a. The coils 60C and 60D and the magnetic sensor 66C are arranged on the front surface of the left piece portion 67b.

The flexible substrate 67 further has a lateral portion 67c extending rightward from the upper piece portion 67a. The stage driving device 10 according to the embodiment has a so-called moving coil structure in which the permanent magnets 50 are attached to the front yoke 20 serving as the secured section and the coils 60 are attached to the intermediate plate 40 serving as the movable section. When the intermediate plate 40 moves, the flexible substrate 67 attached to the intermediate plate 40 moves together. The lateral portion 67c has flexibility, and reduces the resistance that is generated when the flexible substrate 67 moves together with the intermediate plate 40.

As conceptually illustrated in FIG. 4, the stage driving device 10 is electrically coupled to a controller 70 that has control over the imaging apparatus. An image signal of an object obtained through photoelectric conversion by the imaging element 11 is transmitted to the controller 70 via the flexible substrate (not illustrated) coupled to the connector 46; is processed by an image processing circuit; and is converted into predetermined image data.

Each coil 60 and each magnetic sensor 66 are coupled to the controller 70 via the flexible substrate 67. The controller 70 controls energization of each coil 60 to drive the intermediate plate 40. The signal detected by each magnetic sensor 66 is transmitted to the controller 70. The controller 70 acquires, for example, positional information of the intermediate plate 40 (the imaging element 11) based on the signal.

The posture and behavior of the imaging apparatus are detected by a posture detector 71. The detection signal of the posture detector 71 is input to the controller 70. The posture detector 71 includes, for example, a gyro sensor. The controller 70 acquires, for example, information on the magnitude and direction of a hand motion (or a behavior of the imaging apparatus caused by another factor) applied to the imaging apparatus based on the detection signal from the posture detector 71. Energization of the coils 60 is controlled to avoid an image blur on the light receiving surface of the imaging element 11.

When the position of the imaging element 11 is controlled to correct, for example, an image blur caused by a hand motion (hereinafter, referred to as motion blur), the intermediate plate 40 is finely moved at very high speed. The structure that supports the intermediate plate 40 is required to provide a movement with small dynamic resistance and high response. However, the respective components constituting the stage driving device 10 have individual differences in precision within allowable ranges for a product. Moreover, assembly of a plurality of components involves variations in precision. For example, the structure that supports the intermediate plate 40 using the spherical rolling bodies 25 and 35 provides a smooth movement of the intermediate plate 40. However, the support state suitable for a certain stage driving device 10 differs from that for another stage driving device 10 depending on the profile irregularity and location accuracy of the front surfaces and rear surfaces of the sandwiched portions 47. Thus, very small clearances are set at the supported portions of the sandwiched portions 47 provided by the support guide portions 24 and the support guide portions 34 to accommodate the individual differences in precision and the variations in precision of assembly. The stage driving device 10 according to the embodiment includes a measure to provide a stable movement of the intermediate plate 40 even with such clearances. The measure is described in detail below.

Figure 9:
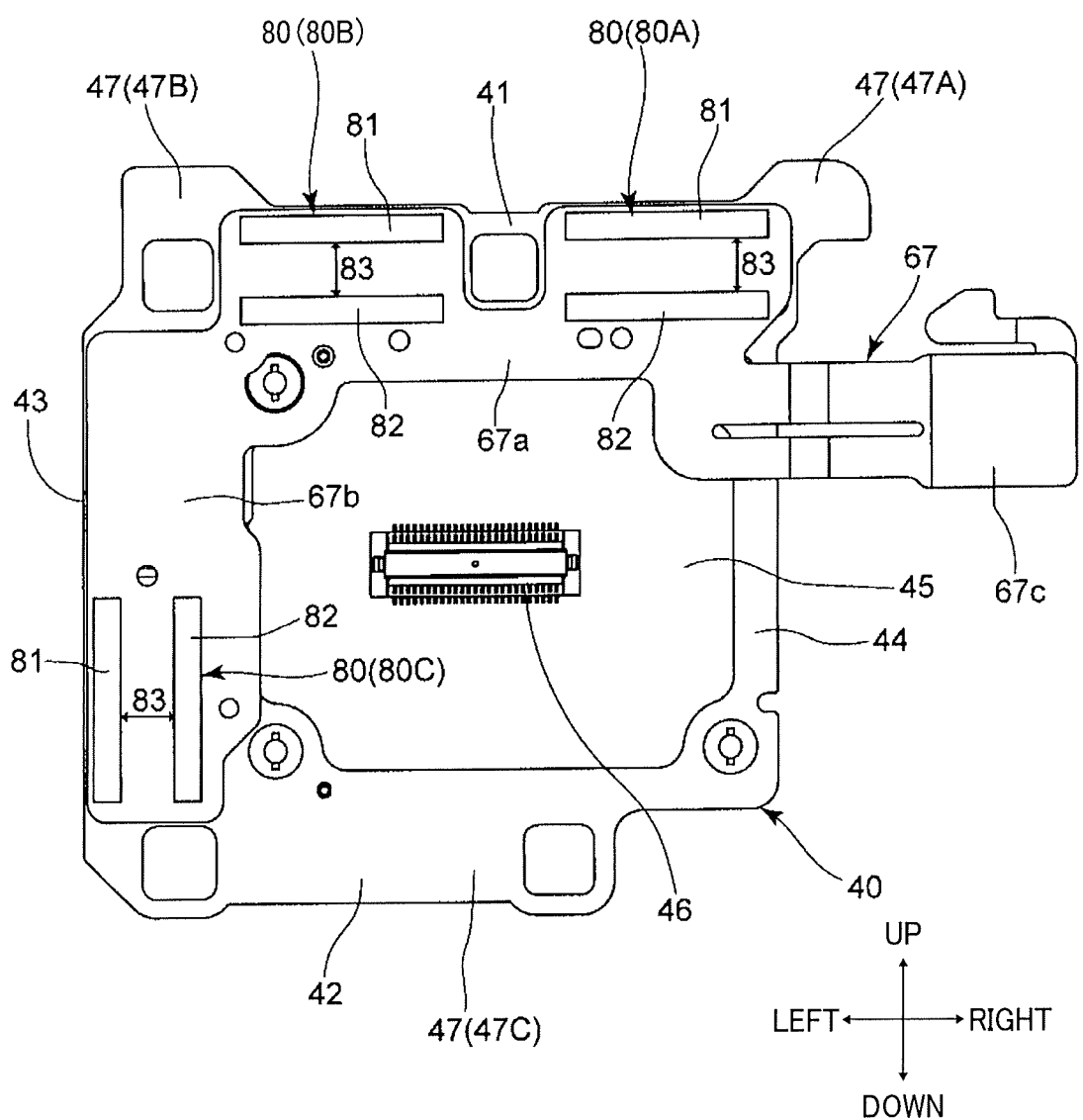
FIG. 9 is a rear view of the intermediate plate including a magnetic body for magnetic spring.

As illustrated in FIG. 9, a plurality of magnetic bodies 80 are attached to the rear surface of the flexible substrate 67. More specifically, two magnetic bodies 80 are disposed on the upper piece portion 67a, and one magnetic body 80 is disposed on the left piece portion 67b. Thus the three magnetic bodies 80 in total are disposed. The two magnetic bodies 80 disposed on the upper piece portion 67a are referred to as a magnetic body 80A and a magnetic body 80B sequentially from the right. The one magnetic body 80 disposed on the left piece portion 67b is referred to as a magnetic body 80C. Each magnetic body 80 is made of, for example, a metal in a thin plate form.

The magnetic bodies 80A, 80B, and 80C are respectively aligned in the forward and backward directions with the permanent magnets 50A, 50B, and 50C provided on the front yoke 20. Magnetically attractive forces from the respective permanent magnets 50A, 50B, and 50C act on the corresponding magnetic bodies 80A, 80B, and 80C. The attractive forces serve as magnetic springs that attract the intermediate plate 40 toward the front yoke 20 to maintain a state in which the front surfaces of the three sandwiched portions 47 of the intermediate plate 40 are in contact with the three rolling bodies 25. Thus, the position in the forward and backward directions of the intermediate plate 40 can be stably determined although the clearances in the forward and backward directions to accommodate the individual differences and assembly errors of the components are provided between the subset of the front yoke 20 and rear yoke 30 serving as the secured section, and the intermediate plate 40 serving as the movable section. Consequently, the intermediate plate 40 is prevented from rattling in the forward and backward directions and from being inclined with respect to the optical axis OX, thereby providing support and movement with high precision of the intermediate plate 40. That is, the position and direction of the light receiving surface of the imaging element 11 can be managed with high precision.

The permanent magnets 50 and the magnetic bodies 80 that function as the magnetic springs are disposed at three positions including two positions (the subset of the permanent magnet 50A and the magnetic body 80A, and the subset of the permanent magnet 50B and the magnetic body 80B) spaced apart in the right and left directions, and one position (the subset of the permanent magnets 50C and the magnetic body 80C) spaced apart from the two positions in the upward and downward directions. Thus, the intermediate plate 40 can be urged in a well balanced manner with high stability.

Each magnetic body 80 includes a pair of divided magnetic bodies 81 and 82. The divided magnetic body 81 and the divided magnetic body 82 have narrow and long rectangular shapes in a view in the optical-axis direction and have the longitudinal directions parallel to each other. In a view in the optical-axis direction like a view in FIG. 11, the size in the longitudinal direction of each of the divided magnetic bodies 81 and 82 is referred to as "length", and the size in the transverse direction of each of the divided magnetic bodies 81 and 82 is referred to as "width". The divided magnetic body 81 and the divided magnetic body 82 have lengths equivalent to each other and have widths equivalent to each other. In each magnetic body 80, the divided magnetic body 81 and the divided magnetic body 82 have a gap 83 therebetween.

In each of the divided magnetic bodies 80A and 80B, the divided magnetic body 81 and the divided magnetic body 82 have the longitudinal directions extending in the right and left directions, and the divided magnetic body 81 and the divided magnetic body 82 have the gap 83 in the upward and downward directions. In the divided magnetic body 80C, the divided magnetic body 81 and the divided magnetic body 82 have the longitudinal directions extending in the upward and downward directions, and the divided magnetic body 81 and the divided magnetic body 82 have the gap 83 in the right and left directions.

Figure 10:
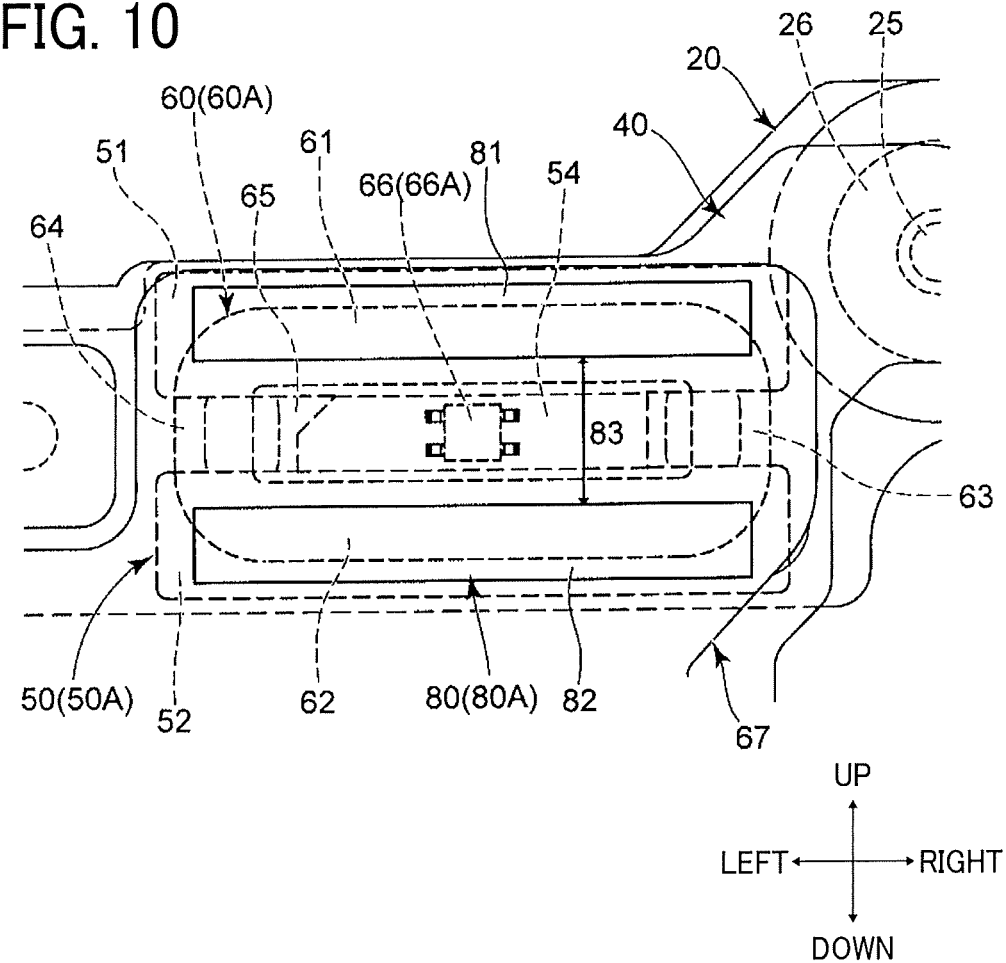
FIG. 10 is an enlarged rear view of an area around the magnetic body in FIG. 9.

The magnetic body 80A is secured on the rear surface (back surface) of a portion which is included in the upper piece portion 67a of the flexible substrate 67 and to which the coil 60A is attached (see FIG. 10). The magnetic body 80B is secured on the rear surface (back surface) of a portion which is included in the upper piece portion 67a of the flexible substrate 67 and to which the coil 60B is attached. The magnetic body 80C is secured on the rear surface (back surface) of a portion which is included in the left piece portion 67b of the flexible substrate 67 and to which the coil 60C is attached. Each magnetic body 80 is secured to the flexible substrate 67 by a desirable method, such as bonding with an adhesive or attaching with a double-sided adhesive tape.

Figure 11:
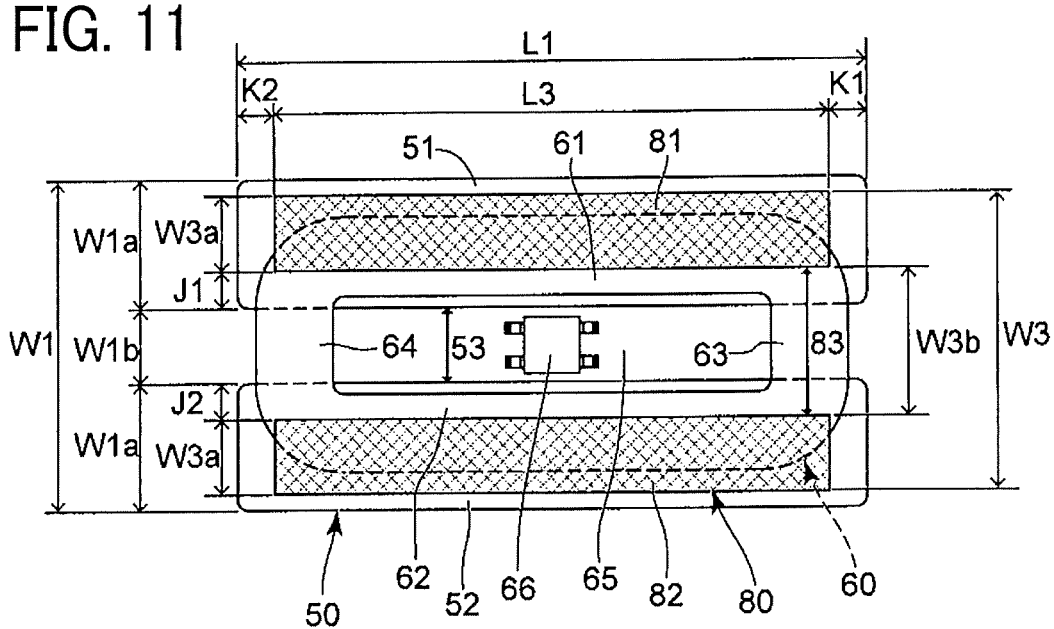
FIG. 11 is a rear view illustrating an arrangement of a magnetic body and other components.

FIGS. 10 and 11 illustrate the specific arrangement of a magnetic body 80. FIG. 10 illustrates the magnetic body 80A. FIG. 11 corresponds to any one of the magnetic bodies 80A, 80B, and 80C. FIGS. 10 and 11 illustrate the positional relationship at the initial position of the intermediate plate 40. The positions of the respective portions (the coil 60, the magnetic sensor 66, and the magnetic body 80) supported by the intermediate plate 40 change in accordance with the movement of the intermediate plate 40.

The one divided magnetic body 81 constituting the magnetic body 80 is aligned with the divided magnet 51 of the corresponding permanent magnet 50 and the long-side portion 61 of the corresponding coil 60 in the forward and backward directions (the projection positions overlap one another in a view in the optical-axis direction). The other divided magnetic body 82 constituting the magnetic body 80 is aligned with the divided magnet 52 of the permanent magnet 50 and the long-side portion 62 of the coil 60 in the forward and backward directions (the projection positions overlap one another in a view in the optical-axis direction). At the initial position of the intermediate plate 40, the longitudinal directions of the divided magnetic bodies 81 and 82 are parallel to the longitudinal directions of the divided magnets 51 and 52.

As illustrated in FIG. 11, a width (an external width) W3 of the entire magnetic body 80 including the pair of divided magnetic bodies 81 and 82 and the gap 83 is smaller than the width (the external width) W1 of the entire permanent magnet 50. A width W3a of each of the divided magnetic bodies 81 and 82 is smaller than the width W1a of each of the corresponding divided magnets 51 and 52. A width W3b of the gap 83 between the divided magnetic bodies 81 and 82 is larger than either one of the width W1b of the gap 53 between the divided magnets 51 and 52 and the width W2b (see FIG. 7) of the air-core portion 65. At the initial position illustrated in FIG. 11, the width W3a of each of the divided magnetic bodies 81 and 82 is within the range of the width W1a of corresponding one of the divided magnets 51 and 52 (the entire width W3a overlaps the width W1a in a view in the optical-axis direction). The divided magnets 51 and 52 respectively have driving margins J1 and J2 in the width direction, the driving margins J1 and J2 not overlapping the divided magnetic bodies 81 and 82 at the initial position. When the coil 60 and the magnetic body 80 are moved from the initial position to one side in the width direction (downward in FIG. 11) within the range of the driving margin J1, a state in which the entire width W3a of the divided magnetic body 81 is within the range of the width W1a of the divided magnet 51 is maintained. When the coil 60 and the magnetic body 80 are moved from the initial position to the other side in the width direction (upward in FIG. 11) within the range of the driving margin J2, a state in which the entire width W3a of the divided magnetic body 82 is within the range of the width W1a of the divided magnet 52 is maintained. Thus, when the permanent magnet 50 and the magnetic body 80 are moved relative to each other in the width direction, a relation where the divided magnetic bodies 81 and 82 are respectively aligned with the divided magnets 51 and 52 in the forward and backward directions (the projection positions of the divided magnetic bodies 81 and 82 respectively overlap the divided magnets 51 and 52) is ensured within the ranges of the driving margins J1 and J2. The intermediate plate 40 can be moved within the ranges without a deviation of the magnetic body 80 from the permanent magnet 50.

The divided magnetic body 81 and the divided magnetic body 82 have lengths equivalent to each other and are disposed at positions aligned with each other in the longitudinal direction. Thus, a length L3 of each of the divided magnetic bodies 81 and 82 is equivalent to a length (an external length) L3 of the entire permanent magnet 80. The length L3 of each of the divided magnetic bodies 81 and 82 is smaller than the length L1 of each of the corresponding divided magnets 51 and 52.

At the initial position illustrated in FIG. 11, the length L3 of each of the divided magnetic bodies 81 and 82 is within the range of the length L1 of each of the divided magnets 51 and 52. The divided magnets 51 and 52 respectively have driving margins K1 and K2 in the longitudinal direction, the driving margins K1 and K2 not overlapping the divided magnetic bodies 81 and 82 at the initial position. When the coil 60 is moved from the initial position to one side and the other side in the longitudinal direction within the ranges of the driving margin K1 and K2, a state in which the entire lengths L3 of the divided magnetic bodies 81 and 82 are respectively within the ranges of the lengths L1 of the divided magnets 51 and 52 is maintained. Thus, when the permanent magnet 50 and the magnetic body 80 are moved relative to each other in the longitudinal direction, a relation where the divided magnetic bodies 81 and 82 are respectively aligned with the divided magnets 51 and 52 in the forward and backward directions (the projection positions of the divided magnetic bodies 81 and 82 respectively overlap the divided magnets 51 and 52) is ensured within the ranges of the driving margins K1 and K2. The intermediate plate 40 can be moved within the ranges without a deviation of the magnetic body 80 from the permanent magnet 50.

As described above, the range in which the length L2a of the air-core portion 65 (the long-side portions 61 and 62) is accommodated in the length L1 of the permanent magnet 50, and the range in which the width W2 of the coil 60 is accommodated in the width W1 of the permanent magnet 50 define an actual driving range in which the voice coil motor controls the driving of the intermediate plate 40. Since the driving margins J1 and J2 and the driving margins K1 and K2 are set, the relation in which at least one of the divided magnetic bodies 81 and 82 is entirely aligned with the corresponding one of the divided magnets 51 and 52 in the forward and backward directions is maintained in a major portion of the driving range of the intermediate plate 40 by the voice coil motor.

For example, it is assumed that the magnetic body 80 moves upward in FIG. 11 by the driving of the intermediate plate 40. In this case, a portion of the one divided magnetic body 81 is deviated from the position at which the divided magnetic body 81 faces the divided magnet 51 in the forward and backward directions; however, the other divided magnetic body 82 can maintain the state in which the divided magnetic body 82, entirely in the width direction (the width W3a), faces the divided magnet 52 in the forward and backward directions until the movement distance exceeds the driving margin J2. In contrast, when the divided magnetic body 80 is moved downward in FIG. 11 by the driving of the intermediate plate 40, the divided magnetic body 81 can maintain the state in which the divided magnetic body 81, entirely in the width direction (the width W3a), faces the divided magnet 51 in the forward and backward directions until the movement distance exceeds the driving margin J1. Thus, the attractive force of the permanent magnet 50 can continually act on one of the divided magnetic body 81 and the divided magnetic body 82, and the permanent magnet 50 and the one of the divided magnetic bodies 81 and 82 can function as a magnetic spring.

The structure that makes the intermediate plate 40 stable according to the effect of the magnetic spring provided by the permanent magnet 50 and the magnetic body 80 can be reduced in size compared with a structure using a mechanical urging portion, such as a tension spring or a compression spring, and is excellent in terms of productivity and manufacturing cost. Specifically, since the magnetic body 80 is made of a metal in a simple thin plate form, the magnetic body 80 can be obtained at low cost. The flexible substrate 67 provided with the magnetic bodies 80 is attached to the intermediate plate 40 to complete a structure for magnetic spring. With the structure, a dedicated structure for attaching an urging portion is not provided at the front yoke 20, the rear yoke 30, and the intermediate plate 40. Since the magnetic body 80 is attached to the flexible substrate 67, in particular, the back side of the region in which the coil 60 is attached (see FIG. 8), the area of the flexible substrate 67 is not increased. As illustrated in FIG. 8, the space U2 between the rear surface of the coil 60 and the front surface of the rear yoke 30 simply has a portion that houses the thin magnetic body 80. The stage driving device 10 is not increased in size in the upward and downward directions and in the right and left directions.

Each permanent magnet 80 includes the pair of divided magnetic bodies 81 and 82 spaced apart in the width direction of the coil 60. The divided magnetic bodies 81 and 82 are disposed on both sides of the air-core portion 65 of the coil 60 (see FIG. 11). Thus, the divided magnetic bodies 81 and 82 are disposed at positions at which the divided magnetic bodies 81 and 82 do not overlap in the forward and backward directions the magnetic sensor 66 located inside the air-core portion 65 (in a direction along the movement plane perpendicular to the optical axis OX, at a position different from the magnetic sensor 66). Since the divided magnetic bodies 81 and 82 are located in this way, the magnetic forces that act on the divided magnetic bodies 81 and 82 from the permanent magnet 50 less affect the detection accuracy of the magnetic sensor 66.

As described above, the driving margins J1 and J2 are provided in the width direction and the driving margins K1 and K2 are provided in the length direction as the differences between the dimensions of the divided magnets 51 and 52 and the dimensions of the divided magnetic bodies 81 and 82. In the driving range of the intermediate plate 40 by the voice coil motor, at least one of the divided magnetic bodies 81 and 82 is continually aligned with the corresponding one of the divided magnets 51 and 52 in the forward and backward directions and can function as a magnetic spring.

As illustrated in FIG. 11, the driving margins J1 and J2 in the width direction are set at positions near the center in the width direction of the permanent magnet 50. In other words, the divided magnetic bodies 81 and 82 are disposed at positions near the external shape in the width direction of the permanent magnet 50. With the configuration, the width W3b of the gap 83 between the divided magnetic bodies 81 and 82 can be increased. As far as the width W3b is large, the distance from the magnetic sensor 66 located within the range of the gap 83 to the divided magnetic bodies 81 and 82 is increased. Thus, the divided magnetic bodies 81 and 82 further less affect the detection accuracy of the magnetic sensor 66.

In contrast to the configuration according to the embodiment, the divided magnetic bodies 81 and 82 may be disposed at positions near the center in the width direction of the permanent magnet 50 to set the driving margins J1 and J2 at positions near the external shape in the width direction of the permanent magnet 50. However, when the divided magnetic bodies 81 and 82 are disposed at positions near the center in the width direction of the permanent magnet 50, the gap between the divided magnetic bodies 81 and 82 in the width direction decreases, and the distance from the magnetic sensor 66 decreases.

As described above, the divided magnetic bodies 81 and 82 are provided at positions at which the divided magnetic bodies 81 and 82 do not overlap the magnetic sensor 66. Moreover, the positional relationship between the divided magnetic bodies 81 and 82 and the divided magnets 51 and 52 is set to locate the divided magnetic bodies 81 and 82 to be separated from the magnetic sensor 66 as much as possible. Thus, the detection accuracy of the magnetic sensor 66 is minimally affected while the effect of a magnetic spring is obtained.

As illustrated in FIG. 8, the permanent magnet 50, the coil 60, the flexible substrate 67, and the magnetic body 80 are disposed sequentially from the front between the front yoke 20 and the rear yoke 30. Since the magnetic body 80 is located on the rearmost side of the movable section, the force of the magnetic spring that causes the magnetic body 80 to be attracted to the permanent magnet 50 acts to press the magnetic body 80 against the rear surface of the flexible substrate 67 and to press the entire movable section forward from the rear. Accordingly, the force of the magnetic spring can be reliably applied to the intermediate plate 40, and the magnetic body 80 can be reliably held at the flexible substrate 67.

Unlike the embodiment, the magnetic body 80 may be disposed on the front surface side (in the space U1 in FIG. 8) of the coil 60, so that the magnetic body 80 directly faces the permanent magnet 50 without the coil 60 and the flexible substrate 67 interposed therebetween. With such a configuration, the effect of a magnetic spring can be obtained. With this configuration; however, the force that causes the magnetic body 80 to be attracted to the permanent magnet 50 acts in a direction in which the magnetic body 80 is separated from the coil 60. In this embodiment, such a separation load does not act on the magnetic body 80 and hence the magnetic body 80 is reliably held.

As described above, the stage driving device 10 according to the embodiment causes the magnetic force of the permanent magnet 50 to act on the magnetic body 80 to obtain a magnetic spring, and the intermediate plate 40 is stably supported by the magnetic spring. Based on this, the magnetic body 80 is provided at a position different from the position of the magnetic sensor 66 in the direction along the movement plane in which the intermediate plate 40 moves. Thus, the magnetic body 80 does not affect the detection accuracy of the magnetic sensor 66 and the driving of the intermediate plate 40 can be controlled with high precision.

For the configuration in which the magnetic body 80 does not overlap the magnetic sensor 66, the pair of divided magnetic bodies 81 and 82 are allocated on both sides of the air-core portion 65 of the coil 60. With this configuration, even when the intermediate plate 40 moves to one of both sides in the width direction of the coil 60, an effect of a substantially uniform magnetic spring can be obtained.

Moreover, since the divided magnetic bodies 81 and 82 are arranged to extend in the longitudinal direction of the respective divided magnets 51 and 52 constituting the permanent magnet 50, an effect of an excellent magnetic spring with a compact structure can be obtained.

Although the embodiment of the present disclosure has been described above, the present disclosure is not limited to such a specific embodiment, and various modifications and changes can be made without departing from the spirit and scope of the disclosure.

While the intermediate plate 40 is supported via the spherical rolling bodies 25 and 35 in the stage driving device 10 according to the embodiment, the intermediate plate 40 may be movably supported by another support structure different from the spherical rolling bodies 25 and 35. For example, the movable section may be supported by a so-called XY stage including two-step stage mechanism that is linearly movable.

The disclosure is particularly effective for the embodiment in which the magnetic sensor 66 is disposed in the air-core portion 65 of the coil 60. However, a magnetic sensor may be disposed outside an air-core portion of a coil. The disclosure is established as far as a magnetic body for magnetic spring is disposed not to overlap a magnetic sensor and the requirement that the magnetic body does not affect the detection accuracy of the magnetic sensor is satisfied.

While the divided magnets 51 and 52 divided in the width direction of the coil 60 constitute the permanent magnet 50 in the stage driving device 10 according to the embodiment, a permanent magnet that is not divided may be provided for each coil.

While the front yoke 20 and the rear yoke 30 constitute the secured section in the stage driving device 10 according to the embodiment, a member serving as a base of a secured section may be a non-magnetic body and a yoke may be additionally attached.

In contrast to the stage driving device 10 according to the embodiment, the disclosure is applicable to a so-called moving magnet structure in which a permanent magnet is provided at a movable section. In this case, a coil, a magnetic sensor, and a magnetic body (for magnetic spring) are provided at a secured section. Based on this, the magnetic body may be disposed to exhibit an effect of magnetic spring between the magnetic body and the permanent magnet at the movable section (the magnetic body being aligned with the permanent magnet in a direction perpendicular to the movement plane in which the movable section moves), and not to affect the detection accuracy of the magnetic sensor (the position of the magnetic body being different from the position of the magnetic sensor in a direction along the movement plane in which the movable section moves).

The stage driving device 10 according to the embodiment drives the imaging element 11. The disclosure is also applicable to an optical element (a lens or the like) other than the imaging element in the imaging apparatus.

The purpose of driving the imaging element using the stage driving device may be a purpose other than correction for a motion blur. For example, the stage driving device 10 according to the embodiment may tilt the imaging element 11 within a plane perpendicular to the optical axis OX. The motion of the imaging element 11 may adjust the tilt of composition to be shot.

The disclosure is suitable for an imaging apparatus; however, is applicable to an apparatus other than the imaging apparatus. The object to be driven by a stage driving device may be an object other than one of the imaging element and the optical element.

With the stage driving device and the method for manufacturing the stage driving device according to the embodiment of the disclosure, the movable section can be made stable with the simple and small structure using the magnetic force that acts between the magnet and the magnetic body. Since the magnetic body is disposed at the position at which the magnetic body less affects the detection accuracy of the magnetic sensor, the driving of the movable section can be controlled with high precision. Since the movable section supports one of the imaging element and the optical element, the imaging apparatus excellent in stability of an object to be driven by the stage driving device and in prevision of driving the object can be obtained.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A stage driving device comprising:
a secured section;
a movable section supported movably along a movement plane relative to the secured section;
a driver including at least one magnet at one of the secured section and the movable section and at least one coil at the other one of the secured section and the movable section, the driver being configured to move the movable section along the movement plane;
at least one magnetic sensor at one of the secured section and the movable section provided with the coil, the magnetic sensor being configured to detect a position of the movable section with respect to the secured section; and
at least one magnetic body at the one of the secured section and the movable section provided with the coil, the magnetic body being configured to make the position of the movable section stable with respect to the secured section in a direction perpendicular to the movement plane using a magnetic force that acts between the magnetic body and the magnet,
wherein the coil is an air coil comprising an air-core portion.

2. The stage driving device according to claim 1, wherein the coil comprises a pair of substantially parallel straight portions on both sides of the air-core portion in a width direction of the coil, and wherein the magnetic body includes a pair of magnetic bodies extending along the pair of straight portions of the coil.

3. The stage driving device according to claim 2, wherein the magnetic sensor is disposed in the air-core portion of the coil, and
wherein the pair of magnetic bodies are separately located on both sides of the magnetic sensor in the width direction of the coil.

4. The stage driving device according to claim 2, wherein the magnet includes a pair of magnets extending along the pair of straight portions of the coil, and
wherein each of the pair of magnetic bodies has a width that is smaller than a width of each of the pair of magnets in the width direction of the coil.

5. The stage driving device according to claim 1, wherein the magnet, the coil, and the magnetic body are sequentially disposed in the direction perpendicular to the movement plane.

6. A stage driving device comprising:
a secured section;
a movable section supported movably along a movement plane relative to the secured section;
a driver including at least one magnet at one of the secured section and the movable section and at least one coil at the other one of the secured section and the movable section, the driver being configured to move the movable section along the movement plane;
at least one magnetic sensor at one of the secured section and the movable section provided with the coil, the magnetic sensor being configured to detect a position of the movable section with respect to the secured section; and
at least one magnetic body at the one of the secured section and the movable section provided with the coil, the magnetic body being configured to make the position of the movable section stable with respect to the secured section in a direction perpendicular to the movement plane using a magnetic force that acts between the magnetic body and the magnet,
wherein the coil and the magnetic sensor are disposed on a flexible substrate attached to one of the movable section and the secured section, and
wherein the magnetic body is disposed on a side of the flexible substrate close to a back surface of the coil.

7. The stage driving device according to claim 1, wherein the movable section supports one of an imaging element and an optical element.

8. A method for manufacturing a stage driving device comprising:
providing a secured section;
attaching a movable section to the secured section, such that the movable section is supported movably along a movement plane relative to the secured section; and
attaching a driver including at least one magnet at one of the secured section and the movable section and at least one coil at the other one of the secured section and the movable section, the driver being configured to move the movable section along the movement plane,
attaching at least one magnetic sensor and at least one magnetic body to one of the secured section and the movable section provided with the coil, the magnetic sensor being configured to detect a position of the movable section with respect to the secured section, the magnetic body being configured to make the position of the movable section stable with respect to the secured section in a direction perpendicular to the movement plane using a magnetic force that acts between the magnetic body and the magnet,
wherein the coil is an air coil comprising an air-core portion.

9. The stage driving device according to claim 1, wherein the magnetic sensor is disposed in the air-core portion of the coil.

10. The stage driving device according to claim 2, wherein a lead wire extends straight from the coil.

* * * * *